United States Patent [19]
Oxenrider et al.

[11] 3,746,952
[45] July 17, 1973

[54] ELECTRICAL APPARATUS COMPRISING PERFLUOROAZAOLEFIN AS LIQUID DIELECTRIC

[75] Inventors: Bryce C. Oxenrider, Florham, N.J.; Cyril Woolf, Morristown, N.J.; Wilhelmus M. Beyleveld, Deventer, Netherlands

[73] Assignee: Allied Chemical Corporation, Morristown, N.J.

[22] Filed: July 9, 1971

[21] Appl. No.: 161,934

[52] U.S. Cl............ 317/258, 252/63.7, 260/566 R, 260/566 D, 260/583 GG
[51] Int. Cl. .......................... H01g 1/00, H01g 3/04
[58] Field of Search............... 252/63.7; 260/566 D, 260/583 GG, 566 R; 317/258

[56] References Cited
UNITED STATES PATENTS

| | | | |
|---|---|---|---|
| 2,966,517 | 12/1960 | Hauptschein | 260/583 GG |
| 3,309,606 | 3/1967 | Forster et al. | 317/258 X |
| 3,259,817 | 7/1966 | Adany | 317/258 |
| 2,751,414 | 6/1956 | Miller | 260/566 D |
| 3,038,000 | 6/1962 | Schmidt | 252/63.7 X |
| 2,643,267 | 6/1953 | Pearlson et al. | 260/566 D |
| 3,660,511 | 5/1972 | Ogden | 260/566 R |

FOREIGN PATENTS OR APPLICATIONS

| | | | |
|---|---|---|---|
| 666,733 | 2/1952 | Great Britain | 260/583 GG |

*Primary Examiner*—Roland E. Martin, Jr.
*Attorney*—Arthur J. Plantamura et al.

[57] ABSTRACT

Perfluoroazaolefins are useful as liquid dielectrics in electrical apparatus.

5 Claims, No Drawings

ELECTRICAL APPARATUS COMPRISING PERFLUOROAZAOLEFIN AS LIQUID DIELECTRIC

Electrical apparatus comprising a sealed casing, spaced electrical elements therein adapted to be subjected to differences of electrical potential, and a liquid dielectric between said elements are well known. This invention provides the improvement wherein the liquid dielectric comprises a perfluoroazaolefin having the formula

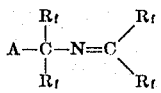

wherein each $R_f$ is independently a perfluoroalkyl radical of one to three carbon atoms and A is fluorine or a radical having the formula

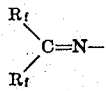

wherein each $R_f$ is independently a perfluoroalkyl radical of one to three carbon atoms. Preferably, each $R_f$ is trifluoromethyl. The liquid dielectric can consist of one or more such perfluoroazaolefins, alone or together with other suitable dielectric liquids. The perfluoroazaolefins are employed in accordance with conventional methods for employing liquid dielectrics.

The perfluoroazaolefins employed in this invention wherein A is fluorine are known compounds, being disclosed, for example, in U.S. Pat. No. 2,643,267 and Canadian Pat. No. 703,479.

The perfluoroazaolefins employed in this invention wherein A has the formula

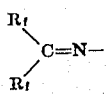

are novel compounds claimed in our copending application Ser. No. 161,349, filed concurrently herewith. The pertinent subject matter of the copending application is incorporated herein by reference. As disclosed in the copending application, perfluoroazaolefins having the formula

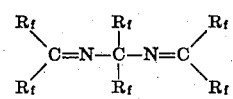

are prepared by reacting a perfluoroalkylidene imine having the formula

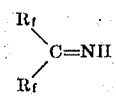

with a perfluoroazaolefin having the formula

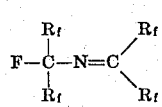

in the presence of an ionizable fluoride salt in an aprotic, polar liquid reaction medium, as represented by the following equation

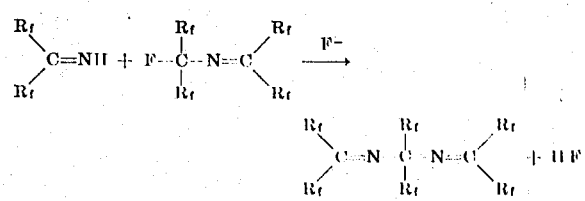

wherein $R_f$ is as defined herein. The reaction is carried out under substantially anhydrous conditions at a temperature ranging from about 50° to about 150° C. Acetonitrile is preferred as the liquid reaction medium and potassium fluoride is preferred as the fluoride salt. Since the fluoride salt also acts as an acceptor of the hydrogen fluoride which is generated as a by-product, at least one mole of the fluoride salt is employed for each mole of hydrogen fluoride generated. The perfluoroazaolefin product is recovered from the reaction mixture by fractional distillation.

The dielectric properties of two representative perfluoroazaolefins of this invention are shown below in Table I.

TABLE I

| Property | Compound A[1] | Compound B[2] |
|---|---|---|
| Boiling Point | 50°C. | 100°C. |
| Freezing Point | −100°C. | −42°C. |
| Specific Gravity | 1.6 | 1.7 |
| Dielectric Constant, 1 kc (ASTM D-150) | 1.8 | 2.2 |
| Dielectric Strength, kv./mil (ASTM D-877) | 27.8 | 28.3 |
| Dissipation Factor, 1 kc (ASTM D-150) | 0.0005 | 0.0006 |
| Volume Resistivity, ohm-cm (ASTM D-257) | Not Measured | 3.96 × 10¹² |

[1] Perfluoro-2,4-dimethyl-3-aza-2-pentene
[2] Perfluoro-2,4,4,6-tetramethyl-3,5-diaza-2,5-heptadiene Compound B was prepared as follows: 27.5 grams of hexafluoroisopropylidene imine and 55 grams of perfluoro-2,4-dimethyl-3-aza-2-pentene were added to 11.6 grams of potassium fluoride in 50 ml of acetonitrile. The reaction mixture was then sealed, maintained at about 75° C. for about 18 hours, allowed to stand at room temperature over a weekend, and then maintained at 75° C. for an additional 18 hours. The reaction mixture was filtered to remove the fluoride salt. By fractionally distilling the filtrate, 30 grams of a colorless liquid having a boiling point of about 100° C. was obtained. The liquid was identified as perfluoro-2,4,4,6-tetramethyl-3,5-diaza-2,5-heptadiene.

We claim:
1. In an electrical apparatus comprising a sealed casing, spaced electrical elements therein adapted to be subjected to differences of electrical potential, and a liquid dielectric between said elements, the improvement wherein the liquid dielectric comprises a perfluoroazaolefin having the formula

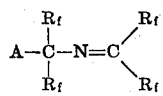

wherein each $R_f$ is a perfluoroalkyl radical of 1 to 3 carbon atoms and A is fluorine or a radical having the formula

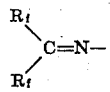

wherein each $R_f$ is a perfluoroalkyl radical of 1 to 3 carbon atoms.

2. The improvement of claim 1 wherein A is fluorine

3. The improvement of claim 2 wherein each $R_f$ is trifluoromethyl.

4. The improvement of claim 1 wherein A has the formula

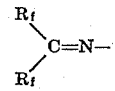

wherein each $R_f$ is a perfluoroalkyl radical of 1 to 3 carbon atoms.

5. The improvement of claim 4 wherein each $R_f$ is trifluoromethyl.